(12) United States Patent
Schoch et al.

(10) Patent No.: US 10,294,701 B2
(45) Date of Patent: May 21, 2019

(54) COVER DEVICE FOR A RETAINING JAWS MODULE

(71) Applicant: AUDI AG, Ingolstadt (DE)

(72) Inventors: Marion Schoch, Neckarsulm (DE); Jean-Bernard Le Griffon, Ingolstadt (DE)

(73) Assignee: Audi AG, Ingolstadt (DE)

( * ) Notice: Subject to any disclaimer, the term of this patent is extended or adjusted under 35 U.S.C. 154(b) by 922 days.

(21) Appl. No.: 14/654,983

(22) PCT Filed: Dec. 20, 2013

(86) PCT No.: PCT/EP2013/003883
§ 371 (c)(1),
(2) Date: Jun. 23, 2015

(87) PCT Pub. No.: WO2014/101995
PCT Pub. Date: Jul. 3, 2014

(65) Prior Publication Data
US 2015/0368941 A1    Dec. 24, 2015

(30) Foreign Application Priority Data

Dec. 20, 2013 (DE) .................. 10 2012 025 392

(51) Int. Cl.
*B60J 5/04* (2006.01)
*E05C 1/08* (2006.01)
(Continued)

(52) U.S. Cl.
CPC .............. *E05C 1/08* (2013.01); *B60J 5/0433* (2013.01); *B60J 5/0458* (2013.01);
(Continued)

(58) Field of Classification Search
CPC .......... E05C 1/08; E05C 19/007; E05C 17/54; B60J 5/0433; B60J 5/0458; E05B 63/126;
(Continued)

(56) References Cited

U.S. PATENT DOCUMENTS 1,004,716 A * 10/1911 Voight ................ E05B 17/0045
292/341.12
1,005,841 A * 10/1911 Hurd ................... E05B 17/0045
292/341.12

(Continued)

FOREIGN PATENT DOCUMENTS

CN          1930353       3/2007
CN        101337560       1/2009
(Continued)

OTHER PUBLICATIONS

International Search Report issued by the European Patent Office in International Application PCT/EP2013/003883.
(Continued)

*Primary Examiner* — Kristina R Fulton
*Assistant Examiner* — Faria F Ahmad
(74) *Attorney, Agent, or Firm* — Henry M. Feiereisen LLC (57) ABSTRACT

A cover device, includes a movable cover configured to cover retaining jaws of a retaining jaws module; a retaining cover connected to a side wall frame of a vehicle body and configured to enclose in the shape of a U an insertion end side of a retaining jaws module for insertion of a striker plate module to releasably couple with the retaining jaws module so as to connect a vehicle door with the side wall frame, and adjacent longitudinal sides of the retaining jaws module in transverse direction of the vehicle; and a rubber lip config- (Continued)

ured to elastically connect the retaining cover to the retaining jaws module and to compensate for tolerance compensation.

14 Claims, 6 Drawing Sheets

(51) Int. Cl.
    *E05B 15/02*     (2006.01)
    *E05B 63/12*     (2006.01)
    *E05B 63/14*     (2006.01)
    *E05B 79/04*     (2014.01)
    *E05B 81/00*     (2014.01)
    *E05B 85/04*     (2014.01)
    *E05B 85/22*     (2014.01)
    *E05C 17/54*     (2006.01)
    *E05C 19/00*     (2006.01)

(52) U.S. Cl.
    CPC ............ *E05B 63/126* (2013.01); *E05B 63/14* (2013.01); *E05B 79/04* (2013.01); *E05B 85/04* (2013.01); *E05B 15/029* (2013.01); *E05B 81/00* (2013.01); *E05B 85/22* (2013.01); *E05C 17/54* (2013.01); *E05C 19/007* (2013.01); *E05Y 2201/11* (2013.01); *Y10T 292/0801* (2015.04); *Y10T 292/082* (2015.04); *Y10T 292/0816* (2015.04); *Y10T 292/0834* (2015.04); *Y10T 292/0846* (2015.04); *Y10T 292/1023* (2015.04); *Y10T 292/1028* (2015.04); *Y10T 292/694* (2015.04); *Y10T 292/696* (2015.04); *Y10T 292/71* (2015.04); *Y10T 292/73* (2015.04)

(58) Field of Classification Search
    CPC .......... E05B 63/14; E05B 79/00; E05B 85/04; E05B 15/029; E05B 81/00; E05B 85/22; E05B 15/022; E05B 63/12; Y10T 292/694; Y10T 292/0834; Y10T 292/0836; Y10T 292/084; Y10T 292/0846; Y10T 292/0852; Y10T 292/71; Y10T 292/73; Y10T 292/696; Y10T 2952/209; Y10T 292/0829; Y10T 292/0831; Y10T 292/1028; Y10T 292/0801–292/0821; E05Y 2201/11
    USPC .... 296/146.6; 292/341.14, 3–20, 32, 33, 37, 292/42, 342, 343, 341.15, 121, 122, 191, 292/192, 47, 150, 27, 29, 146, 159, 292/256.63, 256.65, DIG. 40, DIG. 51
    See application file for complete search history.

(56) References Cited

U.S. PATENT DOCUMENTS

| | | | | |
|---|---|---|---|---|
| 1,192,733 | A * | 7/1916 | Bennett | E05B 65/0864 292/175 |
| 1,264,814 | A * | 4/1918 | Kornstein | E05B 63/126 292/27 |
| 1,512,141 | A * | 10/1924 | Segal | E05B 17/2088 292/27 |
| 1,662,907 | A * | 3/1928 | Louzon | E05B 63/12 292/202 |
| 1,964,157 | A * | 6/1934 | Holtzman | E05B 63/126 70/131 |
| 1,977,853 | A * | 10/1934 | Kemp | E05B 63/126 70/103 |
| 2,002,014 | A * | 5/1935 | Kemp | E05B 63/126 70/118 |
| 2,019,263 | A * | 10/1935 | Kemp | E05B 63/126 70/131 |
| 2,118,729 | A * | 5/1938 | Hogan | E05B 65/0858 292/27 |
| 2,192,398 | A * | 3/1940 | Devereaux | E05B 15/022 292/341.14 |
| 2,224,671 | A * | 12/1940 | Crooks | E05B 47/0002 292/25 |
| 2,709,909 | A * | 6/1955 | Vigmostad | E05B 63/126 292/108 |
| 2,854,276 | A * | 9/1958 | Svenson | E05B 85/28 292/280 |
| 2,869,952 | A * | 1/1959 | Saunders | E05C 19/02 109/63.5 |
| 3,583,736 | A * | 6/1971 | Willimzik | E05C 7/06 292/16 |
| 3,583,737 | A * | 6/1971 | Tutikawa | E05C 19/02 292/16 |
| 4,192,039 | A * | 3/1980 | Haberle | B60J 5/101 16/86 B |
| 4,312,527 | A * | 1/1982 | Tannery | E05B 17/2088 292/197 |
| 4,390,195 | A * | 6/1983 | Cox | E05B 85/24 292/221 |
| 4,566,725 | A * | 1/1986 | Klein | E05B 63/127 292/191 |
| 4,685,722 | A * | 8/1987 | Srock | B60J 5/0426 293/128 |
| 5,124,186 | A * | 6/1992 | Wycech | B60J 5/0444 264/46.6 |
| 5,417,470 | A * | 5/1995 | Holt | B60J 5/0416 296/146.6 |
| 5,529,351 | A * | 6/1996 | Donald | E05B 15/102 292/169.13 |
| 5,544,930 | A * | 8/1996 | Stedman | B60J 5/0437 296/146.6 |
| 5,806,917 | A * | 9/1998 | Townsend | B60J 5/0426 296/146.1 |
| 5,868,456 | A * | 2/1999 | Kowalski | B60J 5/0444 296/146.6 |
| 6,302,473 | B1 * | 10/2001 | Weber | B60J 5/0443 296/146.6 |
| 6,564,525 | B1 * | 5/2003 | Staser | B21D 17/04 296/146.5 |
| 6,575,515 | B2 * | 6/2003 | Hashimoto | B62D 47/003 296/146.11 |
| 6,612,625 | B1 * | 9/2003 | Barber | E05C 19/06 220/326 |
| 6,663,169 | B2 * | 12/2003 | Gehringhoff | B60J 5/0444 296/146.6 |
| 6,692,057 | B2 * | 2/2004 | Igarashi | B60J 5/101 292/337 |
| 6,698,140 | B2 * | 3/2004 | Tatsumi | B60J 5/0416 296/146.6 |
| 7,156,448 | B2 * | 1/2007 | Armbruster | B60J 5/0431 296/146.6 |
| 7,857,375 | B2 * | 12/2010 | Huttsell | B60J 5/0425 296/146.6 |
| 7,905,533 | B2 * | 3/2011 | Andre | B60J 5/101 296/146.5 |
| 7,942,457 | B1 * | 5/2011 | Bell | E05B 15/102 292/219 |
| 8,276,977 | B2 * | 10/2012 | Tanaka | B62D 21/157 296/146.6 |
| 8,303,021 | B2 * | 11/2012 | Lichter | B60R 13/043 293/118 |
| 8,371,640 | B2 * | 2/2013 | Horneck | B60J 5/06 296/146.6 |
| 8,517,450 | B2 * | 8/2013 | Lange | B60J 5/06 296/146.6 |
| 8,616,612 | B2 * | 12/2013 | Quinn | E05B 77/38 292/340 |
| 10,041,276 | B2 * | 8/2018 | Schoch | E05B 85/04 |
| 2005/0046228 | A1 * | 3/2005 | Armbruster | B60J 5/0431 296/146.6 |

(56) References Cited

U.S. PATENT DOCUMENTS

| | | | | |
|---|---|---|---|---|
| 2005/0225094 A1* | 10/2005 | Lewis | .................. | E05B 17/0004 |
| | | | | 292/19 |
| 2006/0192392 A1* | 8/2006 | Stiglich | .................. | E05B 83/38 |
| | | | | 292/33 |
| 2007/0273174 A1* | 11/2007 | Abraham | .................. | B60J 5/043 |
| | | | | 296/146.6 |
| 2008/0303306 A1* | 12/2008 | Hirooka | .................. | B60J 5/0412 |
| | | | | 296/146.6 |
| 2010/0219648 A1* | 9/2010 | Watson | .................. | E05F 7/005 |
| | | | | 292/343 |
| 2011/0016934 A1* | 1/2011 | Kowalczyk | ......... | E05B 47/0673 |
| | | | | 70/280 |
| 2012/0112474 A1 | 5/2012 | Muramatsu et al. | | |
| 2013/0031844 A1* | 2/2013 | Quinn | .................. | E05B 77/38 |
| | | | | 49/503 |
| 2015/0076840 A1* | 3/2015 | Schoch | .................. | E05B 81/20 |
| | | | | 292/256 |
| 2015/0246596 A1* | 9/2015 | Kajigai | .................. | B60J 5/0431 |
| | | | | 296/146.6 |
| 2015/0322697 A1* | 11/2015 | Schoch | .................. | E05B 85/04 |
| | | | | 292/157 |
| 2015/0367715 A1* | 12/2015 | Inamoto | .................. | B60J 5/0429 |
| | | | | 296/146.6 |
| 2015/0368939 A1* | 12/2015 | Yamagata | .................. | E05B 79/04 |
| | | | | 292/200 |
| 2016/0160535 A1* | 6/2016 | Haidvogl | .................. | A47B 88/40 |
| | | | | 312/212 |
| 2017/0234037 A1* | 8/2017 | Cassou | .................. | E05C 19/022 |
| | | | | 292/163 |
| 2017/0284126 A1* | 10/2017 | Decayeux | .................. | E05B 35/10 |

FOREIGN PATENT DOCUMENTS

| | | |
|---|---|---|
| CN | 201276903 | 7/2009 |
| CN | 102292557 | 12/2011 |
| CN | 102561837 | 7/2012 |
| CN | 102612582 | 7/2012 |
| DE | 219 029 C | 2/1910 |
| DE | 91 05 557 U1 | 10/1991 |
| DE | 10 2012 011 420 | 12/2013 |
| WO | WO 2004/026647 | 4/2004 |

OTHER PUBLICATIONS

Chinese Search Report dated Apr. 12, 2016 with respect to counterpart Chinese patent application 201380067469.0.

Translation of Chinese Search Report dated Apr. 12, 2016 with respect to counterpart Chinese patent application 201380067469.0.

* cited by examiner

COVER DEVICE FOR A RETAINING JAWS MODULE

CROSS-REFERENCES TO RELATED APPLICATIONS

This application is the U.S. National Stage of International Application No. PCT/EP2013/003883, filed Dec. 20, 2013, which designated the United States and has been published as International Publication No. WO 2014/101995 and which claims the priority of German Patent Application, Serial No. 10 2012 025 392.3, filed Dec. 24, 2012, pursuant to 35 U.S.C. 119(a)-(d).

BACKGROUND OF THE INVENTION

The invention relates to a cover device for a retaining jaws module that can be detachably coupled to a striker plate module, which is arranged on the lock side on the vehicle door of the vehicle body.

A cover device of the generic type is known from DE 10 2012 011 420 A 1.

The coupling device of a vehicle known from DE 10 2012 011 420 A1 for detachable connection of a pivotally supported body panel, particularly a vehicle door, tailgate or front flap to a structural part of the vehicle, includes a first coupling element as striker plate module having two locking wedges with wedge surfaces that are supported so as to be displaceable parallel relative to each other, and a second coupling element as retaining jaws module, interacting with the first coupling element, wherein in a coupled state of the coupling device, the striker plate module and the retaining jaws module are coupled clearance-free via abutting wedge surfaces. The retaining jaws module has two retaining jaws having wedge grooves that have wedge faces, with the striker plate module being received between the two retaining jaws, in that a motor driven drive device, moves the locking wedges apart whereby the locking wedges are pushed with their wedge faces into the wedge grooves and brought into contact with the wedge faces of the wedge grooves.

This coupling device allows an effective form fit with the retaining jaws of the retaining jaws module by using only two locking wedges, namely in all directions that lie in the plane perpendicular to the locking wedges, both in longitudinal direction of the vehicle (x-direction) as well as in vertical direction of the vehicle (z-direction). A strong friction fit is achieved in the direction in which the locking wedges are moved into the wedge grooves of the retaining jaws. This may be improved by arranging so called locking noses on the locking wedges for a form fit in y-direction.

Furthermore, DE 10 201.2 011 420 A1 describes a retaining jaws module, in which the two retaining jaws can be bridged by a movable or displaceable cover in order to prevent ingress of dirt into this strike plate module. However, improvement is needed with regard to the visual appearance of this strike plate module when the vehicle door is open as well as with regard to protection against injury, because this retaining jaws module, particularly its retaining jaws, has corners and edges, which may cause injuries to vehicle passengers during entering and exiting. Additionally, it has to be prevented that a passenger's clothing becomes trapped during entering and exiting.

Moreover, the mounting of such a retaining jaws module on a side wall frame of a vehicle body also has still not been resolved satisfactorily because high tolerances in every spatial direction have to be compensated between the side wall frame and the inside door panel of the vehicle door on which the striker plate module is fastened, since otherwise a reliable coupling of the striker plate module and the retaining jaws module is not ensured, and in particular retracting the striker plate module into the retaining jaws module is already not possible upon closing the vehicle door.

SUMMARY OF THE INVENTION

It is therefore an object of the invention, to provide a cover device for a retaining jaws module of the aforementioned type, particularly of a retaining jaws module of the coupling device known from DE 10 2012 011 420 A1, so that the tolerances between the side wall frame of the vehicle body and the vehicle door can be compensated in a simple constructive manner, and only a low installation complexity is required to install such a striker plate module on the side wall frame of the vehicle body.

This object is achieved by a cover device with the features of the independent claim.

Such a cover device for a retaining jaws module, which is movable by a striker plate module into a releasable coupling that connects a vehicle door with a side wall frame of a vehicle body, the striker plate module is arranged lock-sided at the vehicle door of the vehicle body and is provided with two locking wedges having wedge surfaces that are arranged such that they can be moved in a parallel manner relative to each other, and in which the retaining jaws module that is situated at the side wall frame is provided with two retaining jaws having wedge grooves which have wedge faces, which receive the striker plate module between them, wherein the locking wedges are, separated, and thereby pushed into the wedge grooves by a driving device, and both retaining jaws may be bridged by a displaceable cover device, is characterized according to the invention in that a retaining cover is provided, which is connected to the side wall frame and which encloses in a U-shaped manner the insertion end face provided for inserting the striker plate module into the retaining jaws module and the bordering longitudinal sides of the retaining jaws module extending in transverse direction of the vehicle, and a rubber lip is provided for compensating tolerances, which elastically connects the retaining cover and the retaining jaws module.

This enables using such a rubber lip to compensate tolerances in a constructively simple manner, particularly in longitudinal direction of the vehicle (x-direction) as well as in vertical direction of the vehicle (z-direction). Also the striker plate module can be mounted easily and quickly with the cover device according to the invention, because the retaining jaws module is held by the rubber lip after mounting the retaining cover on the side wall frame of the vehicle body, so that the striker plate module is received by the retaining jaws module when the vehicle door is closed and thereby results in a self-centering and tolerance-compensating effect with regard to the position of the retaining jaws module so that this position only has to be fixed by connection to the side wall frame, for example by a screw connection.

According to an advantageous embodiment of the invention, a frame cover is arranged on the retaining jaws module, which covers the edge of the rubber lip facing the retaining jaws module and connects the open ends of the rubber lip to each other by means of a web like frame cover part of the frame cover so that a tolerance compensation results in transverse direction of the vehicle (y-direction), because as a result of the covering of the rubber lip by the frame cover on the insertion end side, the rubber lip can also realize this tolerance compensation in y-direction. In order to cover the gap between the outer edge of the frame cover part of the frame cover and the adjacent edge of the retaining jaws module resulting from the tolerance compensation in y-direction, a shiftable web cover is advantageously arranged on the frame cover, which web cover covers the outer edge of the frame cover part of the frame cover and terminates with the adjacent edge of the retaining jaws module.

BRIEF DESCRIPTION OF THE DRAWING

Such a frame cover combined with the bridge cover, results in a visually appealing design of the retaining jaws module that is mounted to the side wall frame by the retaining cover.

According to another advantageous embodiment of the invention, a retaining element is provided that connects the retaining jaws module with the side wall frame, and which for fastening to the side wall frame is provided with fastening openings that are tolerance-compensating in z- and x-direction, and fastening openings which are tolerance compensating in y-direction are provided on the retaining element for fastening the retaining jaws module on the retaining element.

This enables a simple and quick installation of the retaining jaws-module by firstly mounting the retaining jaws module, completed by the frame cover and the bridge cover, to the retaining cover, and when the door closed, i.e., in a state in which the striker plate module is coupled with the retaining jaws module, a compensation of the tolerances between vehicle door and side wall frame is achieved by the rubber lip of the retaining cover, and subsequently firmly connecting the retaining jaws module, which is moved into the right position, to the side wall frame by means of the retaining element.

Preferably, the retaining element is U-shaped, wherein the fastening holes for fastening on the side wall frame are provided on at least one leg of the retaining element and the fastening holes for fastening the retaining jaws module are provided on the middle part of the retaining element that connects the two legs.

In a further embodiment of the invention, it is provided that the cover form fittingly connects the two retaining jaws is positively connected and has a flange that form fittingly covers the insertion end face of the retaining jaws module. Preferably, the flange of the cover is provided with noses adapted to the wedge grooves of the retaining jaws. This leads to a complete, visually appealing cover of the retaining jaws module.

According to an embodiment of the invention, it is particularly advantageous when the retaining jaws module is provided with guide rails to guide the cover from a position bridging the retaining jaws into a position permitting the reception of the striker plate module and vice versa, wherein the guide rails align with the wedge grooves of the retaining jaws.

To realize a simple and smooth guidance of the cover, another embodiment of the invention provides that the cover is movably arranged on a guide rod that is connected to stop that connects the ends of the guide rails. Hereby, the cover is prestressed against the position that bridges the retaining jaws by means of a spring element, which is preferably arranged on the guide rod.

According to a refinement of the invention, it is furthermore provided that for guiding the cover within the wedge grooves and the guide rails, the cover is configured to have guide spring elements that are acting vertically to the direction in which the cover is displaced. With this, the cover can be shifted clearance-free between the position releasing the retaining jaws and the position closing the retaining jaws.

A particularly advantageous embodiment of the cover results from the fact that the cover is configured as a shutter system which has flexibly connected slat elements capable of being wound up onto a roller shaft, and which bridges the two retaining jaws, wherein the cover is wound up from a position bridging the locking wedges into a position permitting reception of the striker plate module. This embodiment provides the advantage of requiring less installation space for the cover in its position releasing the locking jaws.

In the following, the invention is described in detail on the basis of an embodiment with reference to the included Figures. It is shown in.

DETAILED DESCRIPTION OF PREFERRED EMBODIMENTS

Figure 1:
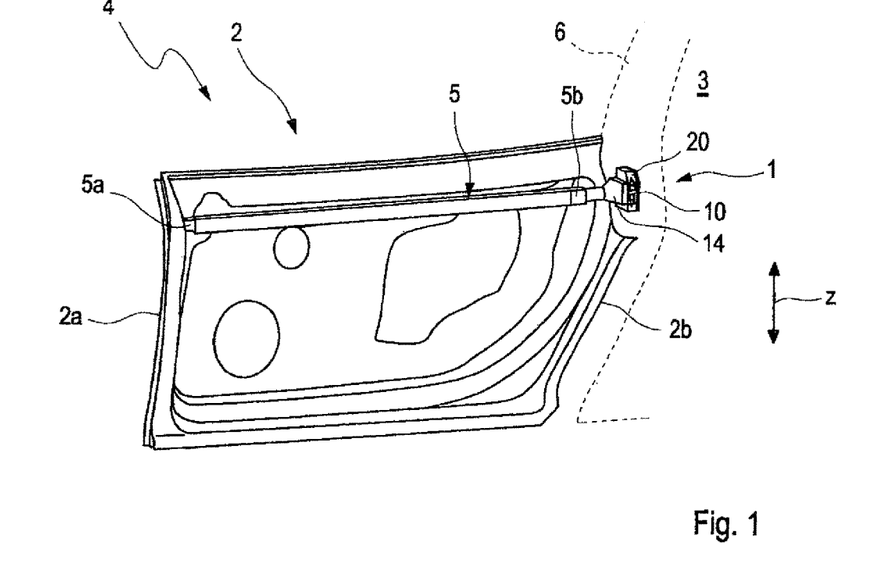
FIG. 1: a schematic and perspective view of a vehicle door that is connected to a side wall frame by means of a coupling device which includes a striker plate module and a retaining jaw module.
Figure 2:
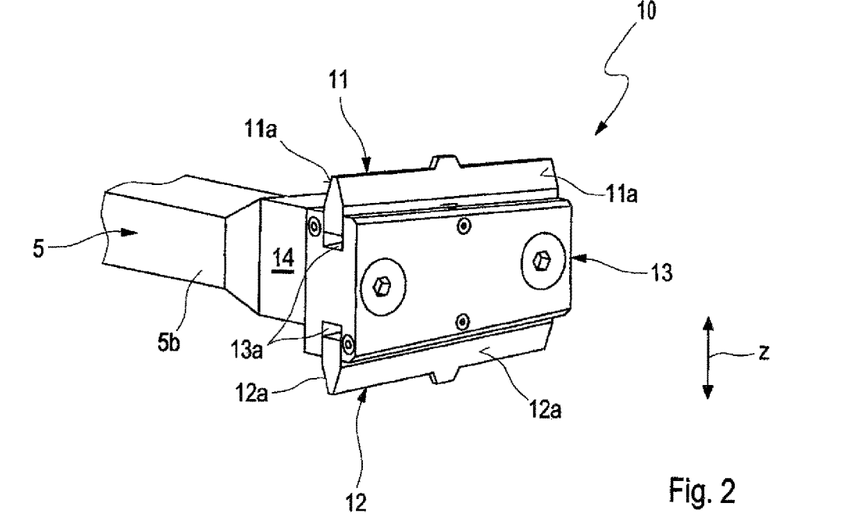
FIG. 2: a schematic view of a striker plate module of the coupling device arranged on the vehicle door according to FIG. 1, FIG. 3: a schematic exploded view of a retaining jaws module including a cover device according to the invention.

FIG. 1 shows a vehicle door 2 of a vehicle body 4, for example of a motor vehicle, which is coupled by a coupling device 1 to a side wall frame 3 that is designed as a B-pillar 6 of the vehicle body 4.

This coupling device 1 is known from DE 10 2012 011 420 A1 and includes a striker plate module 10 that is connected to the vehicle door 2 and a retaining jaws module 20 that is mounted to the B-pillar 6 or the side wall frame 3 of the vehicle body 4, which are coupled to each other in order so as to generate a releasable connection. According to FIG. 1, the striker plate module 10 is coupled to a door stiffening element 5 of the vehicle door 2 extending at the upper part of the vehicle door 2 in longitudinal direction (x-direction) by way of a force fit connection.

The coupling of the striker plate module 10 with the retaining jaws module 20 is achieved in that as a result of closing the vehicle door 2 the striker plate module 1 is first, guided between two retaining jaws 21 and 23 that are arranged on a base plate 25 of the retaining jaws module 20 shown in FIG. 3, and subsequently two locking wedges 11 and 12, which are arranged movable in z-direction within a locking wedge holder 13 of the striker plate module 10, are moved out of grooves 13*a* of the locking wedge holder 13*a* by a drive device 14 and are thereby pushed into wedge grooves 22 and 24 of the retaining jaws 21 and 23, so that wedge faces 11*a* and 12*a* of the locking wedges 11 and 12 are in full surface contact with the wedge faces 22*a* and 22*b* of the wedge grooves 22 and 24 of the retaining jaws 21 and 23.

Figure 3:
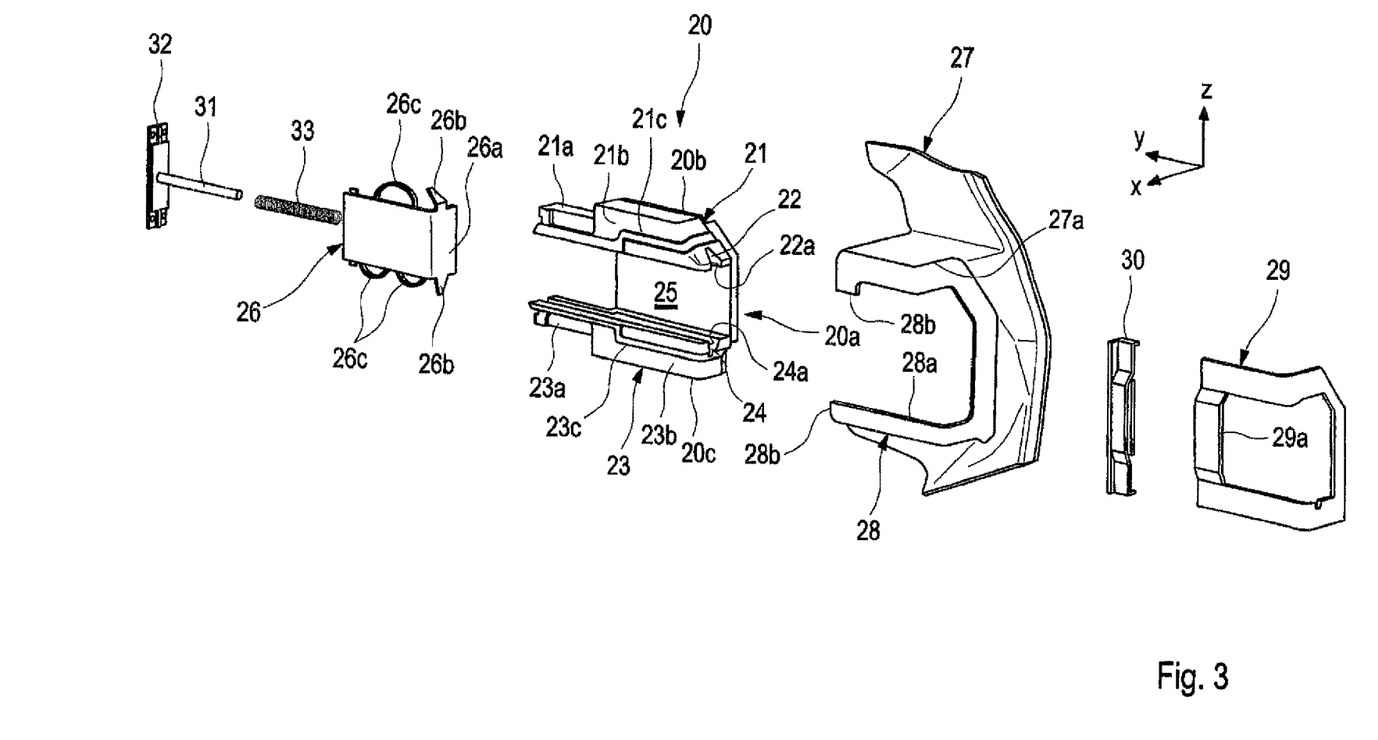

If the retaining jaws module 20 shown in FIG. 3 were mounted as single component to the B-pillar 6 of the vehicle body 4 according to FIG. 1, the retaining jaws 21 and 23 of the retaining jaws module 20 would be visible when the vehicle door 2 is open, which would be disadvantageous regarding the visual appearance and additionally; on the other hand this would also create a considerable risk of contamination due to the open access in the area of the retaining jaws 21 and 23. Furthermore, there would be a significant risk of injury for entering and exiting passengers due to the edges and corners of the exposed retaining jaws 21 and 23; moreover, at these edges and corners, the entanglement of clothing during entering and leaving cannot be excluded.

Figure 4:
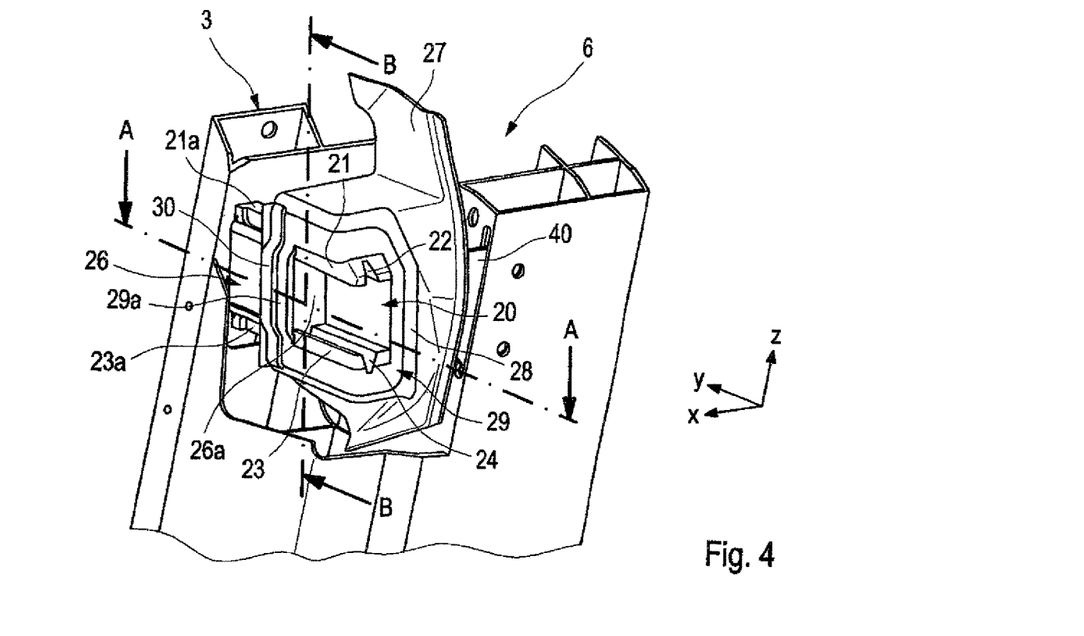
FIG. 4: a schematic view of a retaining jaws module mounted to a side wall frame according to FIG. 1 with a cover device according to the invention in the open position.

Therefore a movable cover 26 is provided for closing this region between the retaining jaws 21 and 23 of the retaining jaws module 20, which movable cover is moved aside by the striker plate module 10 during closing of the vehicle door 2, so that the striker plate module 10 can be guided between the retaining jaws 21 and 23 of the retaining jaws module 10. The position of the cover exposing the retaining jaws 21 and 23 is shown in FIG. 4, while FIG. 5 shows the cover in a position covering the area between the two retaining jaws 21 and 23.

In order to also cover the insertion end face 20*a* of the retaining jaws module 20 that is provided for inserting the striker plate module 10, the flat cover 26 has a flange 26*a* with noses 26*b* that are adjusted to the wedge shape of the wedge grooves 22 and 24 of the retaining jaws 21 and 23.

Figure 9:
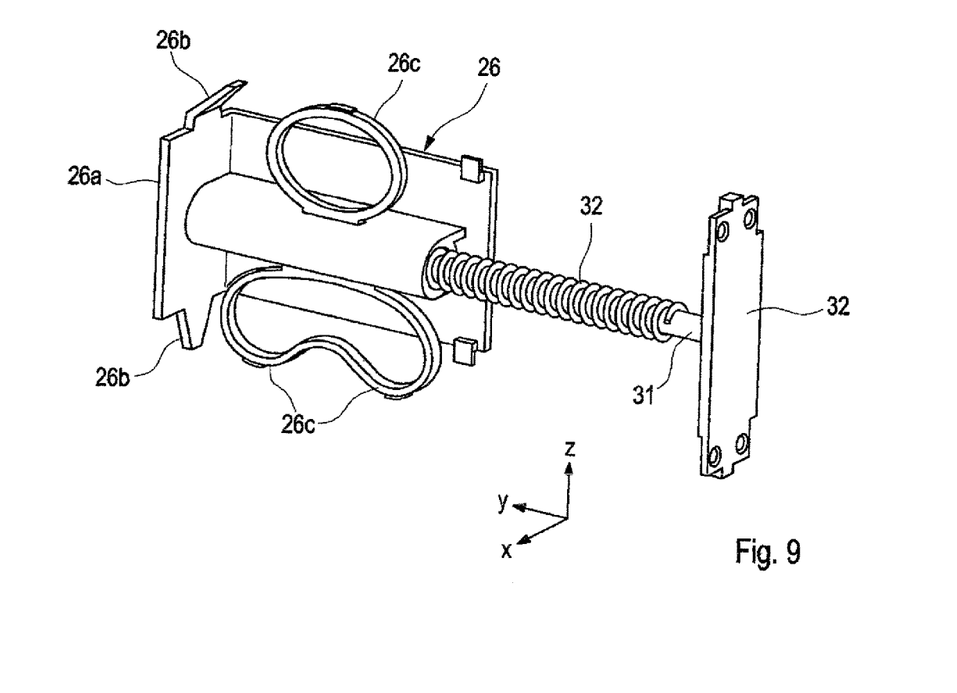
FIG. 9: a schematic view of the cover of the cover device according to the invention.

For guiding the cover 26, guide rails 21*a* and 23*a* running in y-direction and aligning with the wedge grooves 22 and 24 of the retaining jaws 21 and 23, are moulded to the two retaining jaws 21 and 23, wherein according to FIG. 9, guiding spring elements moulded on the rear, side of the cover 26 effect guiding of the cover 26 within the guide rails 21*a* and 23*a* as well as within the wedge grooves 22 and 23.

Figure 5:
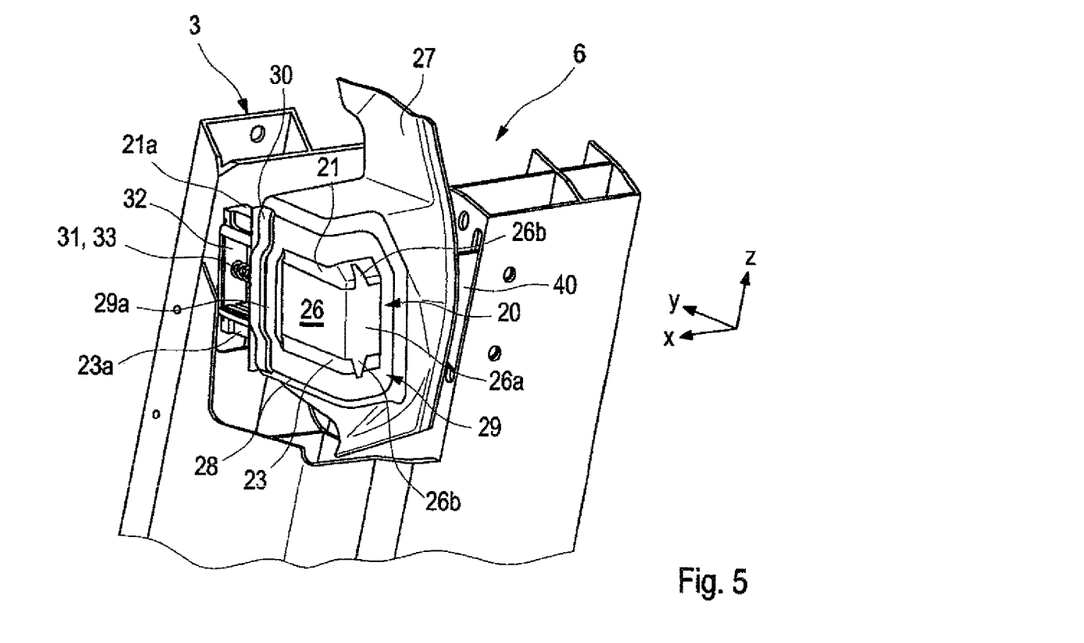
FIG. 5: a schematic view of a retaining jaws module according to FIG. 4 in the closed position.

In mounted position, the cover 26 is additionally guided by a guide rod 31 which, according to FIG. 9, is guided on one end within a guiding opening 26*d* moulded on the rear side of the cover 26 and on the other end is connected to a stop 32, which connects the ends of both guide rails 21*a* and 23*a*, as shown in FIGS. 3 to 5 and 11. Furthermore, a spring element 33 is arranged on the guide rod 31, by which spring element the cover 26 is prestressed in the direction of the position in which it covers the region of the retaining jaws 21 and 23. Thereby, the cover 26 is moved into the position covering the retaining jaws 21 and 23 by the spring force of this spring element 33 when the vehicle door 2 is open, as is shown in FIG. 5.

According to FIGS. 4 and 5, the retaining jaws module 20 together with the cover device, is mounted to the side wall frame 3, wherein the cover device further includes further components besides the already mentioned cover 26 with guide rod 31 and spring element 33 according to FIG. 3, i.e., a retaining cover 27 with a rubber lip 28 and a frame cover 29 with a web cover 30.

This cover device, together with the cover 26, not only effects the covering of the exposed retaining jaws 21 and 23, but together with the rubber lip 28 of the retaining cover 27 and the frame cover 29 with the web cover 30, also compensates tolerances between the vehicle door 2 and the side wall frame 3.

The retaining cover 27 is connected to the side wall frame 3 and according to FIG. 3 has a receiving opening 27*a*, which according to FIGS. 4 and 5 partially encloses the retaining jaws module frame-like, that is it encloses the insertion end side 20*a* and the adjacent longitudinal sides 20*b* and 20*c* of the retaining jaws module 20 U-shaped, wherein the connection between the retaining cover 27 and the retaining jaws module 20 is generated by the elastic rubber lip 28 that partially contactingly encloses the retaining jaws 21 and 23 and the edge of the base plate 25 that is situated in the area of the insertion end side 20*a*.

The retaining jaws module 20 is adjusted to the position of the striker plate module 10 that is defined by the vehicle door 2. Because the retaining cover 27 is rigidly connected to the side wall frame 3 of the vehicle body 4, the rubber lip 28 compensates the tolerances occurring in x-, y- and z-direction. The tolerance compensation in y- and z-direction is described by the sectional view according to FIG. 6.

Figure 6:
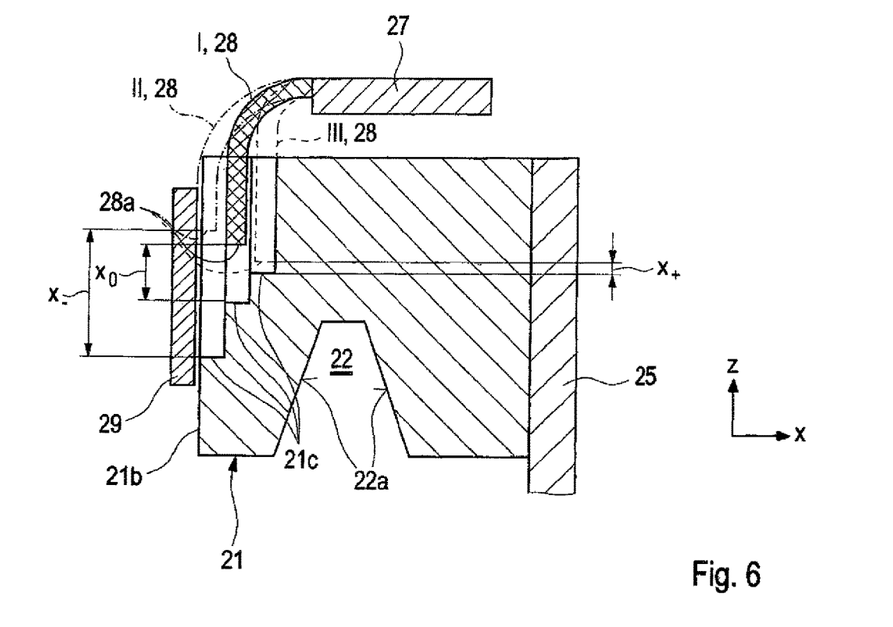
FIG. 6: a schematic sectional view according to section A-A according to FIG. 4, FIG. 7: a schematic sectional view according to section. B-B pursuant to FIG. 4, FIG. 8: a retaining element for mounting the retaining jaws module to a side wall frame.

In this sectional view, the retaining jaw 21 that is arranged on the base plate 25 can be seen with the wedge groove 22 having the associated wedge faces 22*a*. Also shown is the retaining cover 27, which is connected to the rubber lip 28. The course of the rubber lip 28 in the region of the retaining jaw 21 is shown in three positions I, II and III, wherein the position I shows the zero position, position II shows the position with maximum negative tolerance in x- and z-direction, and position III shows the position with maximum positive tolerance in x- and z-direction. For the sake of clarity, the retaining jaw 21 together with the base plate 25 is only shown in position II.

Depending on position I, II or III, the rubber lip 28 covers the retaining jaw's 21 front 21*b* to a higher or lesser degree, wherein the part being covered by the rubber lip 28 is generated by a shoulder 21*c* running in y-direction, whose step height corresponds to the thickness of the rubber lip 28, so that this region of the shoulder 21*c* can be covered flush by the frame cover 29.

FIG. 6 shows the distance between the free edge 28*a* of the rubber lip 28 to this shoulder 21*c*. Thus, this space is designated in position I as $x_0$, in position II as $x_-$ and in position III as $x_+$, whereas starting from value $x_0$, the value $x_-$ is larger and the value $x_+$ is smaller because in position II the highest negative tolerance in x- and z-direction has to be compensated, i.e., the greatest distance exists between the retaining cover 27 and the retaining jaw 21, and in position III the greatest positive tolerance in x- and y-direction is compensated and therefore the smallest distance exists between the retaining cover 27 and the retaining jaw 21.

The same applies to the position of the edge 28*a* of the rubber lip 28 on the other retaining jaw 23 of the retaining jaws module 20. Also at this retaining jaw 23, a shoulder 23*c* extending in y-direction is provided at the front side 23*b*, which shoulder forms a limit for the edge 28*a* of the rubber lip 28.

In order to install the retaining jaws module 20, the retaining cover 29 is first mounted to the retaining jaws module 20. This retaining cover 29 is configured frame-like and is designed so that the edge 28*a* by the rubber lip 28, which faces the retaining jaw is covered, wherein the frame cover element 29*a* of the retaining cover 29 bridges the ends 28*b* of the rubber lip 28.

Figure 7:
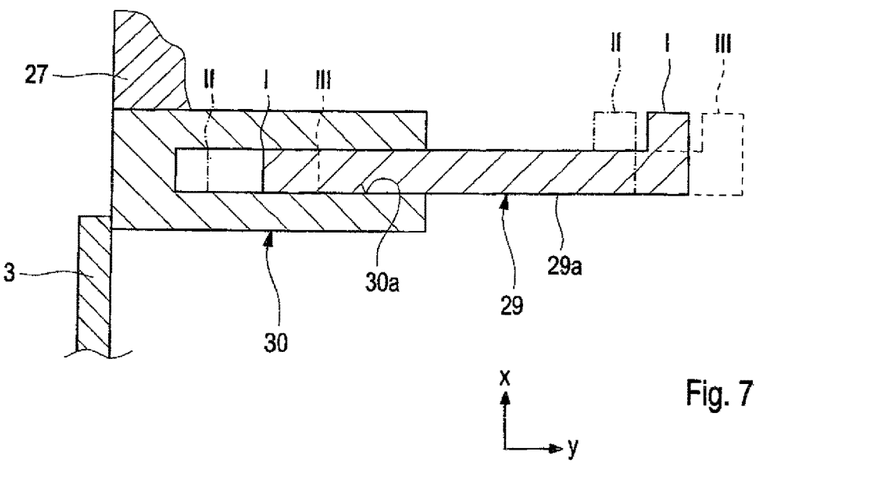

Furthermore, a web cover 30 is pushed on at the outer edge of this frame cover element 29*a* of the frame cover 29 by means of a slot, thereby covering a gap between the edge of the retaining cover 29 and the adjacent edge of the frame cover part 29a resulting from tolerance compensation in y-direction as shown in the sectional view of FIG. 7.

FIG. 7 also shows three positions I, II and III for the frame cover 29. Position I represents the zero position of the frame cover 29, position II represents the position with maximum negative tolerance in y-direction and position III represents the position with maximum positive tolerance in y-direction. The bridge cover 30 aligns with the outer edge of the retaining cover 27 or abuts the side wall frame 3 of the vehicle body. Due to the fact that the bridge cover 30 encloses the outer edge of the frame element 29a so as to be movable in y-direction by means of a slot 30a, tolerance compensation is achieved in y-direction.

FIG. 6 shows the retaining jaws module 20 mounted with the frame cover 29 and the bridge cover 30, wherein the frame cover 30 rests against the shoulder 21c and 23c of the retaining jaw 21 and the retaining jaw 23, and due to the step formed by shoulder 21c and shoulder 23c a space is formed between the frame cover and the retaining jaw 21 or 23 toward the border-side receptacle of the rubber lip 28.

Figure 8:
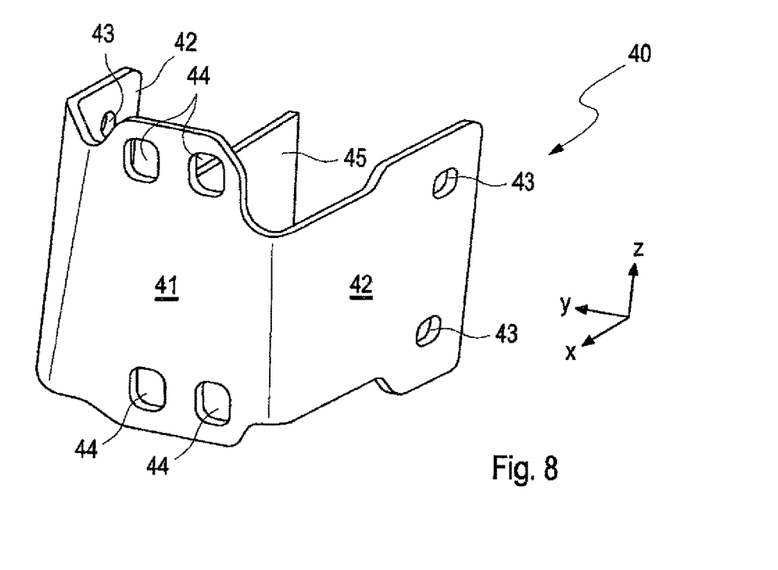

This retaining jaws module 20, together with the frame cover 29 and the bridge cover 30, is pushed into the opening formed by the rubber lip 28 and is connected to the side wall element 3 via a retaining element 40 shown in FIG. 8.

This retaining element 40 is U-shape and is provided with two legs 42 that are connected by a centre section 41 and a retaining wall 45 situated therebetween. This retaining element 40 is connected to the side wall frame 3 so that the legs 42 a oriented in x-direction and the centre section 41 essentially lies in the x-z-plane. The retaining jaws module 20 is connected at its rear side to the retaining element 40 via retaining openings 44, wherein the diameter of these retaining openings is dimensioned so that the retaining jaws module 20 remains slidable in y- and z-direction. For connection with the side wall frame 3, the legs 42 have retaining openings 43 that are configured as oblong hole in x-direction so that the retaining jaws module 20 is slidable in x-direction. As fastening elements, screw elements are provided, wherein the retaining jaws module 20 is inserted into the retaining cover 27 together with the frame cover 29 and the web cover 30 and is thereby connected by the screw elements to the side wall frame via the retaining element 40 so that the retaining jaws module 20 remains slidable in x-, y- and z-direction.

Subsequently, the vehicle door 2 is closed so that the striker plate module 10 can move into the retaining jaws module 20 and can be coupled to the retaining jaws module 20 by adjusting the position of the retaining jaws module 20 to the striker plate module 10 in x-, y- and z-direction. In this position, the retaining jaws module 20 is fastened by the screwing devices and is firmly connected to the side wall frame.

Figure 10:
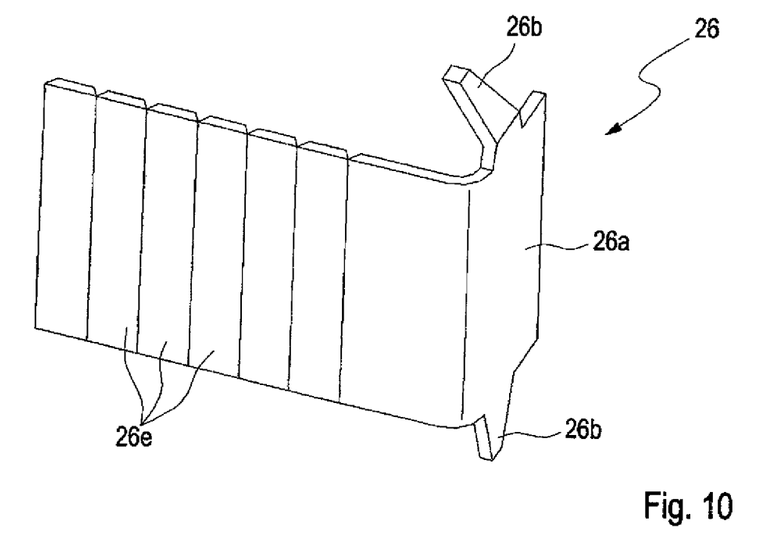
FIG. 10: a schematic view of an alternative cover of the cover device according to the invention.
Figure 11:
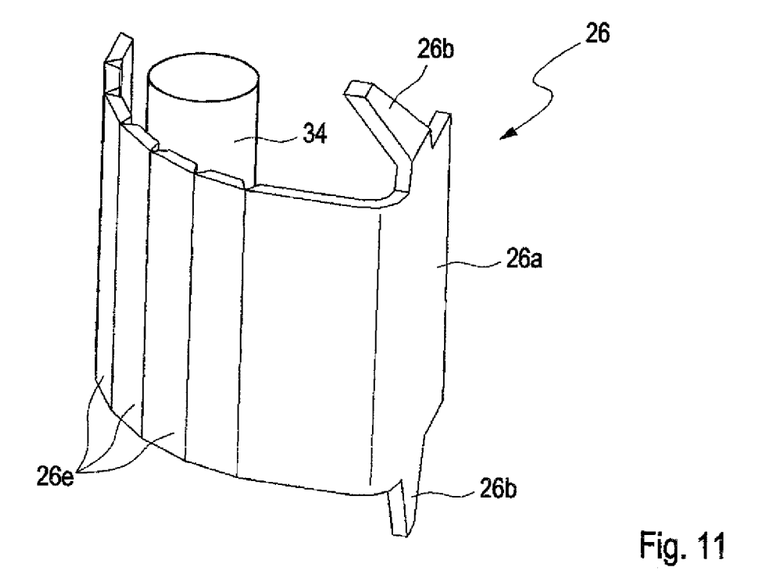
FIG. 11: a schematic view of the cover according to FIG. 11 in a partial wound up position.

An alternative embodiment of the cover 26 as shutter system is shown by FIGS. 10 and 11, in which a part of the cover 26 is made of slat elements 26e that are flexibly connected to each other so that, in order to release the retaining jaws 21 and 23 of the retaining jaws module 30, the cover 26 can be wound up on the roller shaft by means of the slat elements 26e as schematically shown in FIG. 11. Otherwise, this alternative cover 26 is similarly provided with a flange 26 with noses 26b moulded thereon to cover the insertion end face 20a of the retaining jaws module 20.

The invention claimed is:

1. A cover device, comprising:
   a movable cover configured to close a region between retaining jaws of a retaining jaws module and form fittingly connect the retaining jaws;
   a single, unitary retaining cover connected to a side wall frame of a vehicle body and configured to enclose in the shape of a U an insertion end side of the retaining jaws module for insertion of a striker plate module to releasably couple with the retaining jaws module so as to connect a vehicle door with the side wall frame, and adjacent longitudinal sides of the retaining jaws module in transverse direction of the vehicle (y-direction); and
   a rubber lip configured to elastically connect the retaining cover to the retaining jaws module and to compensate for tolerance compensation.

2. The cover device of claim 1, further comprising a frame cover having a web, said rubber lip having an edge disposed on a side proximal to the retaining jaws module and covered by the frame cover, said rubber lip having open ends connected by the web of the frame cover.

3. The cover device of claim 2, further comprising a movable web cover movably arranged on the frame cover and configured to cover an outer edge of the web and to extend flush with an adjacent edge of the retaining jaws module.

4. The cover device of claim 1, further comprising a retaining element configured to connect the retaining jaws module to the side wall frame, said retaining element being provided with first fastening openings for tolerance compensation in z- and x-directions for fastening on the side wall frame, and with second fastening openings for tolerance compensation in y-direction for fastening the retaining jaws module to the retaining element.

5. The cover device of claim 4, wherein the retaining element has a U-shaped configuration, defined by two legs and a center section connecting the two legs, said first fastening openings being provided on at least one of the legs, and said second fastening openings being provided on the center section.

6. The cover device of claim 1, wherein the movable cover includes a flange configured to form fittingly cover the insertion end side of the retaining jaws module.

7. The cover device of claim 6, wherein the flange of the movable cover has noses configured to complement wedge grooves of the retaining jaws.

8. The cover device of claim 1, wherein the movable cover is guided by guide rails of the retaining jaws module from a first position bridging the retaining jaws into a second position allowing the reception of the striker plate module, and vice versa, with the guide rails aligning with wedge grooves of the retaining jaws.

9. The cover device of claim 8, wherein the movable cover is slidably arranged on a guide rod, which is connected to a stop that connects ends of the guide rails.

10. The cover device of claim 7, further comprising a spring element configured to maintain the movable cover under tension in opposition to the first position.

11. The cover device of claim 8, further comprising a spring element arranged on the guide rod and configured to maintain the movable cover under tension in opposition to the first position.

12. The cover device of claim 8, wherein the movable cover includes guiding spring elements which act in vertical relation to a movement direction of the cover for guiding the movable cover in the wedge grooves and the guide rails.

13. The cover device of claim 1, wherein the movable cover is configured as shutter system to bridge the retaining jaws, said shutter system including flexibly connected slat elements for winding onto a roller shaft, said movable cover being wound from a position in which the movable cover bridges the retaining jaws to a position allowing the reception of the striker plate module.

14. The cover device of claim 1, for interaction with a drive device which moves locking wedges of the striker plate module apart in a direction parallel to each other, thereby causing the locking wedges to engage in wedge grooves of the retaining jaws module.

* * * * *